United States Patent [19]

Stanislaw

[11] Patent Number: 4,777,706

[45] Date of Patent: Oct. 18, 1988

[54] APPARATUS FOR MANUFACTURING ENDLESS NEEDLED PAPER MACHINE FELTS

[75] Inventor: Peter P. Stanislaw, Bennington, Vt.

[73] Assignee: Morrison Berkshire, Inc., North Adams, Mass.

[21] Appl. No.: 96,613

[22] Filed: Sep. 14, 1987

[51] Int. Cl.[4] .............................................. D04H 18/00
[52] U.S. Cl. ....................................... 28/110; 28/113; 28/142
[58] Field of Search .................... 28/110, 111, 113, 142

[56] References Cited

U.S. PATENT DOCUMENTS

| | | | |
|---|---|---|---|
| 3,703,752 | 11/1972 | Schulte | 28/113 X |
| 4,536,927 | 8/1985 | Feyerl et al. | 28/110 |
| 4,614,969 | 9/1986 | Gerundt et al. | 28/110 X |
| 4,701,986 | 10/1987 | Feyerl et al. | 28/110 X |

FOREIGN PATENT DOCUMENTS

2324985  1/1974  Fed. Rep. of Germany ........ 28/110

Primary Examiner—Robert R. Mackey
Attorney, Agent, or Firm—Lerner, David, Littenberg, Krumholz & Mentlik

[57] ABSTRACT

An apparatus for manufacturing endless, needled, longitudinally oriented, paper machine felts having a predetermined width formed from a plurality of overlapping loops of a narrower width strip is disclosed. The apparatus includes a first needling mechanism having a working width at least equal to the predetermined width, a feeder to feed a strip of batt from a web to the first needling mechanism, means to reciprocate the web throughout the working width of the first needling mechanism, a second needling mechanism having a working width at least equal to the working width of the first needling mechanism and including a plurality of driven, adjacent needling units each of which is actuable between a needling position and a non-needling position, and means associated with each of the needling units and correlated to the position of the batt strip relative to the working width for selectively actuating corresponding ones of the needling units to needle the strip being fed to the first needling mechanism while the strip is in longitudinal alignment with the corresponding ones of the units.

14 Claims, 5 Drawing Sheets

APPARATUS FOR MANUFACTURING ENDLESS NEEDLED PAPER MACHINE FELTS

FIELD OF THE INVENTION

The present invention relates to apparatus for manufacturing endless, needled, paper machine felts in which a narrow strip of felting batt is applied on and needled to an endless base fabric and/or to adjacent loops of felting batt as a longitudinally extending spiral winding having a pitch in the transverse direction thereof. As used herein, the term "longitudinally oriented felt" has reference to endless, needled paper machine felts of the type described in the preceding sentence.

BACKGROUND OF THE INVENTION

Longitudinally oriented felts have heretofore been made by a number of different processes employing different types of apparatus. In one case, hereinafter referred to as a "full width needling process" and illustrated and described in Canadian Patent No. 980,556 to Cedercreutz, a strip of felting batt is pressure-rolled onto a fabric base in a plurality of longitudinally extending spiral windings until it is fully wound on to the base fabric and, thereafter, the spirally wound longitudinally oriented felt is needled together. The apparatus employed in the Cedercreutz patent utilizes a single, full width, needling mechanism. The adhesion which can be achieved between the loops of felting batt and the underlying base fabric due to the contact pressure generated by the pressure roller is, in the absence of any preliminary needling, insufficient to prevent the felting batt from locally lifting away from the base fabric, so that wrinkles form during the subsequent needling operation. Another disadvantage of the foregoing full width needling process and apparatus is that the joints between loops of the felting batt tend to separate, allowing the loops to shift transversly relative to one another and resulting in variations of thickness in the transverse direction of the completed, needled, longitudinally oriented paper machine felt.

One attempt to overcome the disadvantages inherent in the full width needling process is illustrated and described in U.S. Pat. No. 4,536,927 to Feyerl et al. In the Feyerl et al patent, a needling mechanism having a working width corresponding to the desired width of the completed, needled, longitudinally oriented paper machine felt is utilized in conjunction with a felting batt strip feeder which is transversely reciprocable throughout the working width of the needling mechanism. A small needling unit, having a working width corresponding to that of the felting batt strip, is provided between the feeder and the needling mechanism. The small needling unit is transversely reciprocated in unison with the feeder throughout the working width of the larger needling mechanism. The small needling unit needles each loop of the felting batt strip to the base fabric at the time that the felting batt strip is applied to the base fabric to keep the loops in place. Thereafter, when the felting batt strip has been wound into a number of needled loops corresponding to the full width of the composite longitudinally oriented paper machine felt, the full width needling mechanism is activated to needle the composite construction. The foregoing process, hereinafter referred to as the "sequential strip and full width needling process" represents an improvement over the use only of a full width needling process for needling longitudinally oriented felts. However, the apparatus employed in such sequential strip and full width needling process requires that a bulky needling unit be traversed across the full width of the machine in concert with the felting strip batt web, resulting in problems relating to adequately supporting and transversely reciprocating the needling unit, as well as problems relating to driving the needles of the transversely reciprocating needling unit.

For the foregoing reasons, prior forms of apparatus for manufacturing endless, needled, longitudinally oriented paper machine felts, either by the full width needling process or by the sequential strip and full width needling process, have not been entirely successful in practice.

It is, therefore, a primary object of the present invention to provide an improved apparatus for manufacturing endless, needled, longitudinally oriented paper machine felts by the sequential strip and full width needling process.

Another object of the present invention is to provide improved apparatus for manufacturing endless, needled, longitudinally oriented paper machine felts, in which a full width needling mechanism having a plurality of smaller, selectively operable needling units therein is employed to needle the felting batt strip to adjacent felting batt loops and to the base fabric (where one is used) as the strip is applied thereto.

A further object of the present invention is to provide an improved apparatus for manufacturing endless, needled, longitudinally oriented paper machine felts in which a second full width needling mechanism, having a plurality of selectively actuable smaller width needling units therein, is positioned between a transversely reciprocating roll of felting batt strip and a first full width needling mechanism, and the needling units are selectively actuated to needle the felting batt strip to the adjacent felting batt loops and to the base fabric (where one is used) only while the strip is passing under a corresponding needling unit while it is being wound into loops.

Additional objects and advantages of this invention will become apparent as the following description proceeds.

SUMMARY OF THE INVENTION

Briefly stated, and in accordance with one embodiment of this invention, an improved apparatus for manufacturing endless, needled, paper machine felts having a predetermined width formed from a plurality of overlapping loops of a narrower width strip comprises a first needling mechanism having a working width at least equal to the predetermined width, a feeder to feed a strip of felt batt from a web to the first needling mechanism, means to reciprocate the web throughout the working width of the first needling mechanism, a second needling mechanism having a working width at least equal to the working width of the first needling mechanism and including a plurality of driven, adjacent needling units each of which is actuable between a needling position and non-needling position, and means associated with each of the needling units and correlated to the position of the strip of felt batt relative to the working width for selectively actuating corresponding ones of the needling units to needle the strip while the strip being fed to the first needling mechanism is in longitudinal alignment with the corresponding ones of the units.

BRIEF DESCRIPTION OF THE DRAWINGS

While the specification concludes with claims particularly pointing out and distinctly claiming the subject matter regarded as the invention herein, it is believed that the present invention will be more readily understood from the following description, taken in conjunction with the accompanying drawings, in which:

Figure 1:
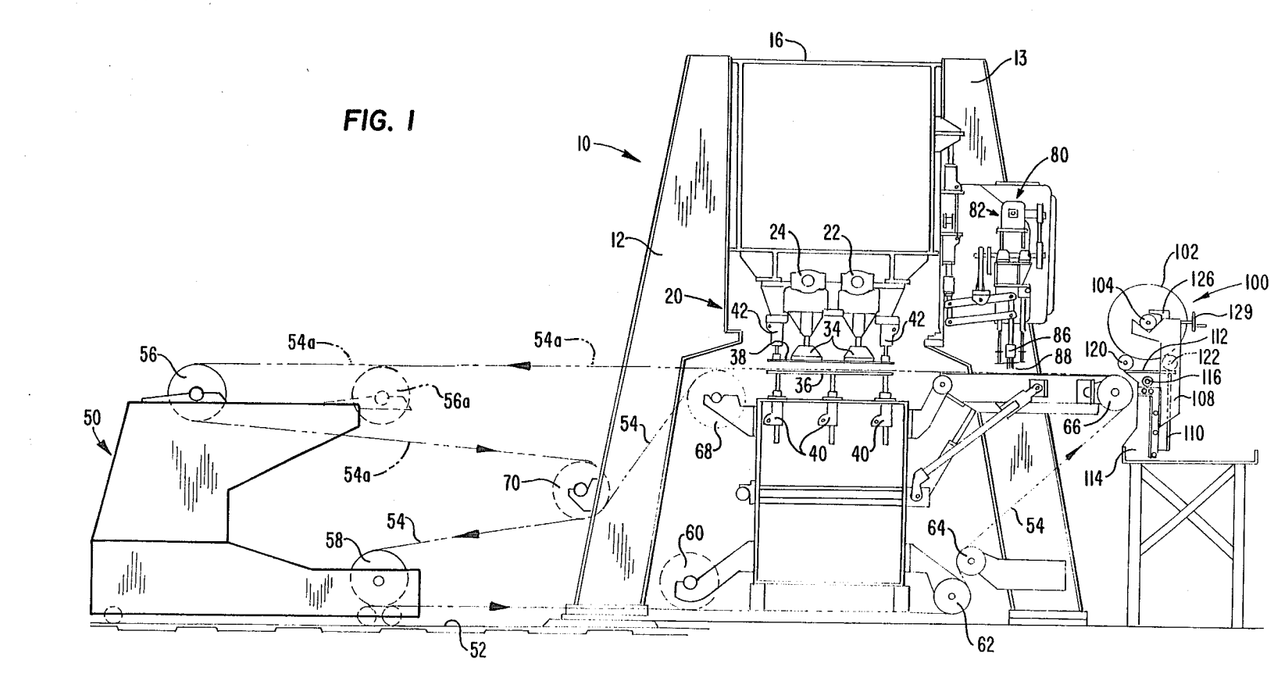
FIG. 1 is a diagrammatic side elevation view showing apparatus according to the present invention for manufacturing endless, needled, longitudinally oriented paper machine felts.
Figure 2:
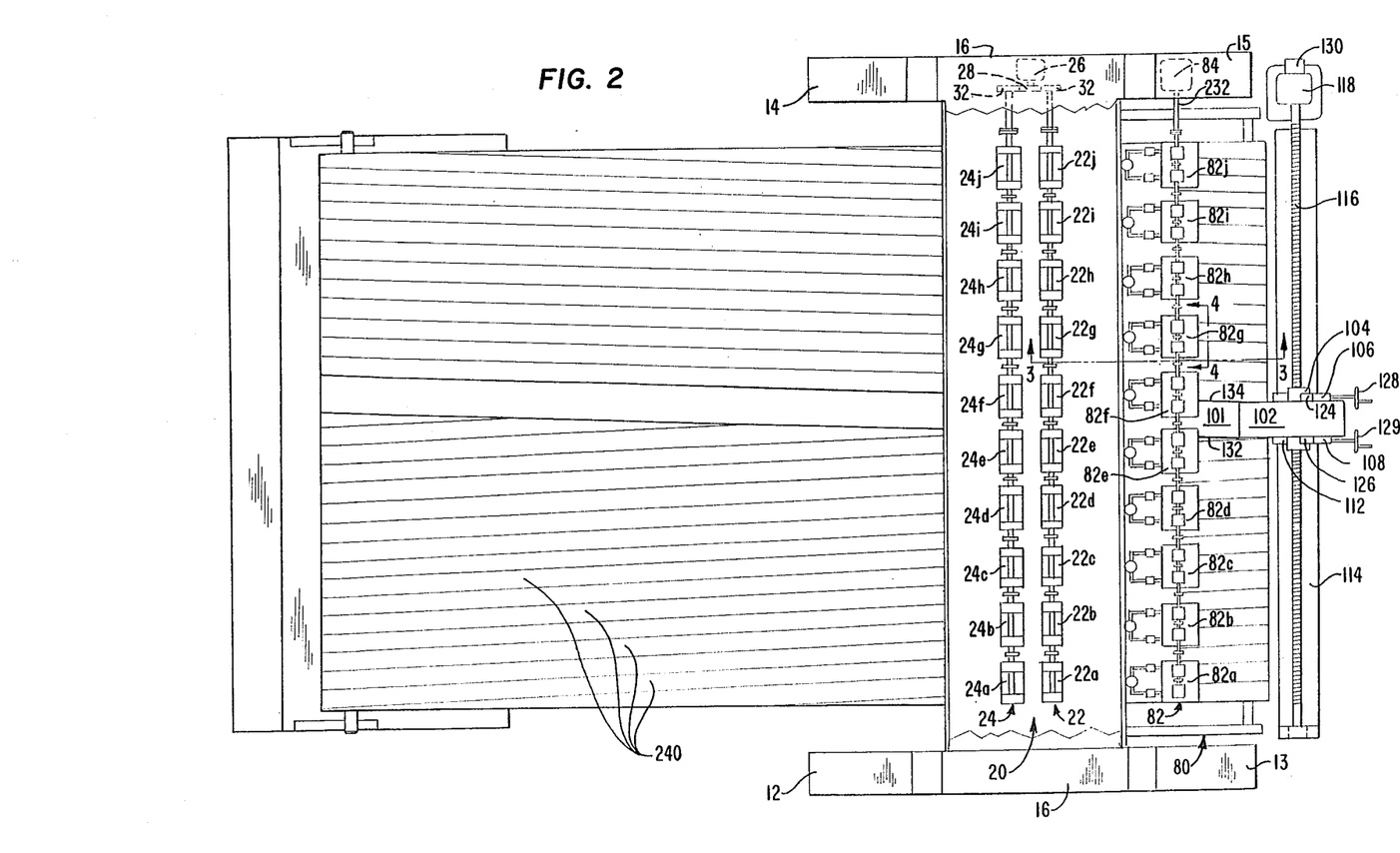
FIG. 2 is a plan view, with parts cut away for clarity, of the apparatus shown in FIG. 1.

Referring to FIGS. 1 and 2, apparatus in accordance with the present invention for manufacturing longitudinally oriented felt has been illustrated generally at 10. The apparatus comprises a first pair of longitudinally spaced loom support legs 12, 13 which support one end of an elevated rectangular loom support frame 16. The other end of the loom support frame 16 is supported by another pair of longitudinally spaced loom legs 14, 15, similar to legs 12, 13. The loom support frame 16 spans the entire width of the apparatus 10 and supports a first needling mechanism, shown generally at 20, which includes two rows 22 and 24 of interconnected, commonly driven needling units or modules 22a–22j and 24a–24j, respectively. The needling units 22a–22j and 24a–24j are driven by a motor 26 and gears 28 and 32. The needling rows 22 and 24 of the first needling mechanism 20 each extend across the entire width of the apparatus 10 so that full width needling of the composite, longitudinally oriented, paper machine felt can be accomplished after the composite felt has been wound from the felting batt strip.

Figure 3:
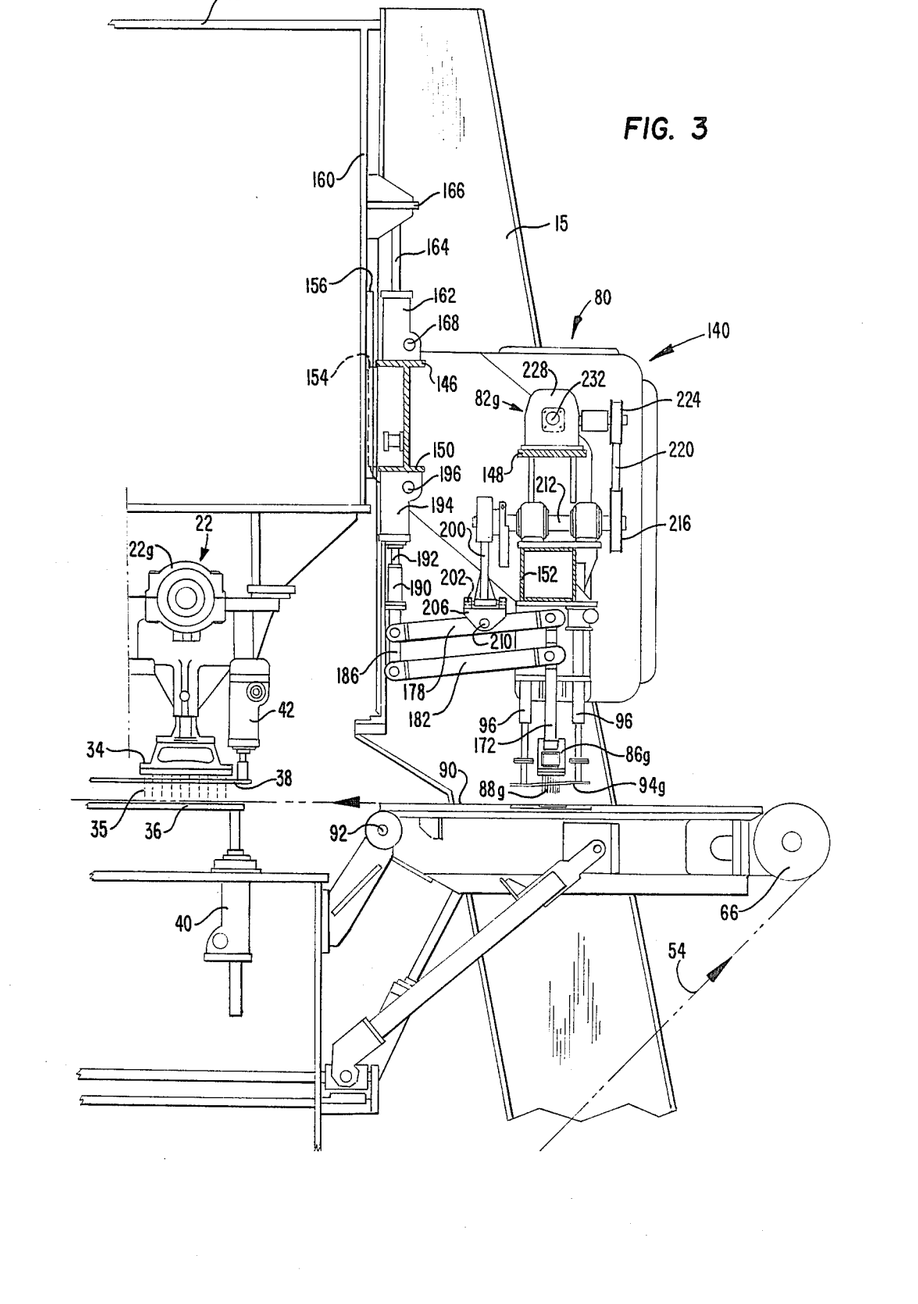
FIG. 3 is an enlarged, sectional, side elevation view, taken along the line 3—3 of FIG. 2, showing one of the needling units of the second needling mechanism in greater detail.

Each of the needling units 22a–22j and 24a–24j includes an eccentrically driven, conventional needle board 34 which carries a plurality of barbed needles 35 (FIG. 3). A vertically adjustable table 36 supports the composite longitudinally oriented paper machine felt below the needle boards 34 during the full width needling operation. A vertically adjustable stripper plate 38 cooperates with the needles 35 of the needle board during this operation, in accordance with conventional practices. A plurality of screw jacks 40, which may be ganged and commonly driven, are employed to raise and lower the table 36. Similarly a plurality of screw jacks 42, which also may be ganged and commonly driven, are employed in raising and lowering the stripper plate 38.

The apparatus 10 also includes a loom and tension unit, shown generally at 50, which is mounted on tracks, one of which is shown at 52, to facilitate movement of the unit 50 towards and away from the first needling mechanism 20 in connection with threading a base fabric, indicated by the broken line 54, on to the apparatus 10. The loom tension unit 50 includes an upper roller 56 which is movably mounted on the tension unit 50 so that it can be moved by means (not shown) from its full line position, to its broken line position, shown at 56a. The loom tension unit 50 also includes a lower roller 58 which is rotatable at a fixed position relative to the tension unit 50.

The fabric 54 may be threaded into the apparatus 10 following two different paths, a "single hitch" path comprising rollers 58, 60, 62, 64, 66, 68 and 70, and a "double hitch" path comprising the aforesaid rollers and including the roller 56 on loom tension unit 50. The double hitch path is used when longer longitudinally oriented felts are to be made. The single hitch path is used when shorter longitudinally oriented felts are to be made. The extra length of the double hitch path is indicated by the broken line 54a.

The roller 62 is preferably driven by a motor (not shown) in order to drive the base fabric 54 through its endless circuit. The roller 64 constitutes a wrap roll which insures that there is sufficient contact between the base fabric and the roll 62 to allow the latter to effectively drive base fabric 54 through its endless path. One or more of the remaining rollers 58–70 may also be driven for this purpose.

The loom support frame 16 supports a second needling mechanism, shown generally at 80, which includes a row 82 of interconnected, commonly driven needling units or modules 82a–82j that are driven by a motor 84. The needling row 82 of the second needling mechanism 80 extends across the entire width of the apparatus 10; however, as will appear in greater detail hereinafter, the various needling units 82a–82j are selectively actuated to needle the felting batt strip only during the time that a portion of the strip is in longitudinal alignment with a corresponding one of the needling units. Each of the needling units 82a–82j includes an eccentrically driven, conventional needle board 86 which carries a plurality of barbed needles 88 (FIG. 3).

A table 90, having one of its ends pivotally supported at 92, supports the felting batt strip below the needle boards 86 during the selective needling of the felting batt strip to the portions of the composite, longitudinally oriented, paper machine felt previously laid down on the base fabric 54. The other, upstream, end of table 90 rotatably supports the roller 66 about which the base fabric 54 is entrained. A vertically adjustable stripper plate 94 is provided at each of the needling units 82a–82j. The stripper plates 94 cooperate with the needle boards 86 at each of the needling units, during the selective operation of the needling units, to strip the batt material from the needles during the upward strokes of the needles. Screw jacks 96 are provided at each of the needling units 82a–82j to facilitate setting the level of the stripper plates 94 relative to the needle boards 86.

The apparatus 10 also includes a transversely reciprocative batt let-off or feeder mechanism, shown generally at 100, which is operable to feed a strip of felting batt 101 from a web or roll 102 thereof onto the base fabric 54 carried atop table 90. The felting batt strip 101 thereafter proceeds with the base fabric and with any other felting material already carried on the base fabric, first under the second needling mechanism 80 and then under the two rows of the first needling mechanism 20, in moving through either the single or double hitch path of the base fabric 54.

As shown in FIGS. 1 and 2, the roll 102 of felting batt is carried on and rotatable relative to a rod or shaft 104 that is supported between vertically arranged slide members 106, 108. The slide members 106, 108 are vertically movable on a guide member 110. The guide member 110 is fixed to and moves along with a horizontally reciprocatable carriage 112 that reciprocates on a support track or frame 114. A lead screw 116 driven by a motor 118 is employed to transversely reciprocate the carriage 112 and roll 102 with respect to frame 114. Alternatively, a rack and pinion gear arrangement, comprising a motor (not shown) carried by carriage 112 and provided with a pinion gear (not shown) that engages a rack gear (not shown) fixed to frame 114, can be employed to transversely reciprocate carriage 112 on frame 114. The carriage 112 also carries a pair of spaced rollers 120, 122 on which the roll 102 of felting batt sits. Also, longitudinally movable clamping members 124, 126, which are moved by respective hand wheels 128, 129, are employed to clamp the shaft 104 relative to the vertical slide members 106, 108.

An electronic control unit, shown generally at 130, is coupled to lead screw 116 (or to the motor of the pinion gear where the alternate rack and pinion drive arrangement for carriage 112 is employed) and is programmed to provide output control signals that are correlated to the position of the carriage 112 and its roll 102 of felting batt relative to the various needling units 82a-82j in the second needling mechanism 80. The electronic control unit 130 is preferably a Model HTMDS90-DBC-100-1PB tracking, multi-turn encoder, made by Computer Conversions Corporation of 6 Dunton Court, East Northport, N.Y. 11731. During the traversing movement of the roll 102 from needling unit 82j to needling unit 82a, the electronic control unit 130 provides respective, sequential, "on" signals to the needling units 82j-82a as the leading side edge 132 of the strip 101 sequentially enters the spaces beneath the respective needling units, and provides respective, sequential, "off" signals to the needling units 82j-82a as the trailing side edge 134 of strip 101 exits from under the respective needling units. Similarly, during the return traversing movement of roll 102 from needling unit 82a to needling unit 82j, control unit 130 provides respective, sequential, "on" signals to the needling units 82a-82j as the then leading side edge 134 of strip 101 sequentially enters the spaces beneath the respective needling units, and provides respective, sequential "off" signals to the needling units 82a-82j as the then trailing side edge 132 of strip 101 exits from under the respective needling units.

Figure 4:
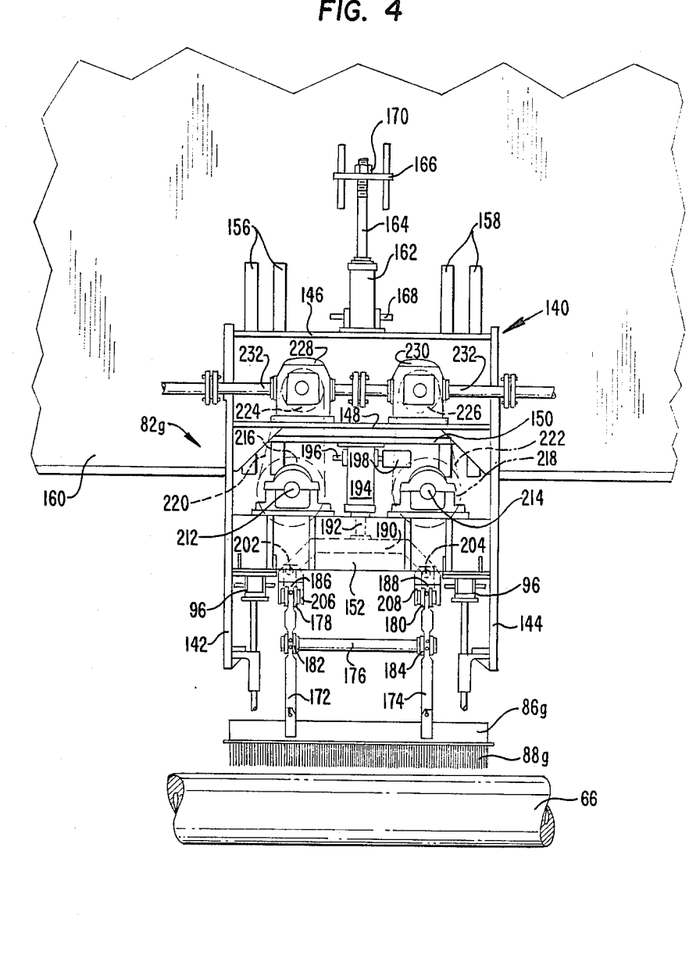
FIG. 4 is an enlarged end elevation view of one of the needling units, taken along the line 4—4 of FIG. 2.

Referring now more particularly to FIGS. 3 and 4, wherein a representative one of the needling units in the second needling mechanism has been illustrated in greater detail, it will be seen that the representative needling unit, in this case needling unit 82g, includes a frame assembly, shown generally at 140, which is comprised of a pair of transversely spaced vertical frame members 142, 144 and a group of vertically spaced horizontal frame members 146, 148, 150 and 152, the latter frame member having a tubular rectangular cross-sectional shape. The frame assembly 140 is provided with a pair of transversely spaced slide members, ore of which is shown at 154 (FIG. 3), which members are welded or otherwise fixed to the horizontal frame members 146 and 150. The slide members 154 are vertically movably carried in guideways 156 and 158 fixed to the forward vertical wall 160 of the rectangular loom support frame 16.

The frame assembly 140 is raised and lowered vertically relative to the rectangular loom support frame 16 by means of a screw jack 162 that is fixed to frame member 146 and includes a lead screw 164 that is fastened to a gib 166 fixedly supported on the front wall 160. The screw jack 162 includes a drive shaft 168 which, when rotated, moves the shaft 164 into or out of the housing 162, concurrently moving the frame assembly 140 up or down relative to the rectangular loom support frame 16.

The drive shafts 168 of the screw jacks 162 of the various needling units 82a-82j are ganged together and commonly driven by a drive motor (not shown) in order to allow all of the needling units 82a-82j to be moved at the same time in conjunction with setting up the apparatus. The lead screws 164 are threaded into the gibs 166 and locked in place relative thereto by means of cap nuts 170. This allows for individual vertical adjustment of the frames 140 that carry the various needling units 82a-82j. The needling boards 86 and needles 88 have been identified in FIGS. 3, 4 and 5 with the subscripts a-j to correlate them to the needling units that drive them. Thus, as seen in FIGS. 3 and 4, which provide details with respect to needling unit 82g, the needle board and needles thereon are identified respectively as 86g and 88g. It will be understood that the description that follows with respect to the details of needling unit 82g also applies to the various other needling units 82a-82f and 82h-82j.

Needle board 86g is supported at the bottom of needle station 82g by a pair of transversely spaced connecting links 172, 174, which links are pivotally connected at their lower ends to the needle board 86g and are interconnected at an intermediate position therein by a connecting link 176. The connecting link 176 is mounted in bearings at its ends, which bearings are carried at the intermediate positions of the connecting links 172, 174. The upper ends of the connecting links 172, 174 and the intermediate positions of the connecting links 172 and 174 are pivotally connected to corresponding ends of respective pairs of connecting links 178, 180 and 182, 184. The other ends of connecting links 178, 180 and 182, 184 are connected to vertically extending arms 186, 188 which are bolted at their upper ends to a yoke 190 that spans the space between the two arms 186, 188. Yoke 190 is suspended from and vertically moved by the lead screw 192 of a screw jack 194 that is fixed to the horizontal frame member 150. The lead screw 192 is extended into and out of screw jack 194 by rotation of a shaft 196 driven by a motor 198 carried by the frame assembly 140. Thus, rotation of the shaft 196 by the motor 198 results in vertical movement of the lead screw 192 into or out of the housing of screw jack 194. This results in corresponding vertical movment of the left ends (as viewed in FIG. 3) of the connecting links 178 and 182 as well as the corresponding ends of their paired connecting links 180 and 184 (FIG. 4). The arm 186 and links 178, 182 and 172 form one parallelogram of a pair of spaced parallelograms that constrain the movement of the needle board 86g and its needles 88g into an essentially vertical reciprocative movement under the influence of a pair of eccentrically driven connecting rods, one of which is shown at 200. The lower ends of connecting rods 200 are provided with sleeve bearings that are rotatably and slideably mounted on shafts 202, 204 carried by respective clevises 206, 208. The lower ends of clevises 206, 208 are pivotally connected to the respective upper connecting links 178, 180, one of such pivotal connections being shown at 210.

The upper ends of the connecting rods 200 are eccentrically driven by drive shafts 212, 214 which, in turn are driven by belt and pulley drive systems including lower pulleys 216, 218, belts 220, 222, and upper pulleys 224, 226. The upper pulleys 224, 226 are driven by respective gear drives 228, 230 that, in turn, are driven by interconnected sections of a drive shaft 232 driven by the motor 84 (FIG. 2).

During operation of the apparatus 10, the motor 84 is continuously driven and, in turn, continuously drives the connecting rods 200, causing the needle board 86g and its needles 88g to constantly reciprocate through a range referred to as the needling range. The length of the needling range is determined by the throw of the eccentric connection between the drive shafts 212, 214 and the connecting rods 200. The vertical elevation of the center point of the needling range of needle board 86g is determined by the elevation of the left ends (as viewed in FIG. 3) or fulcrums of the connecting links 178, 180 and 182, 184. The vertical elevation of the fulcrums of the connecting links 178, 180, 182 and 184 is established by the extension or retraction of the lead screw 192 from the housing of the screw jack 194 which, in turn, is accomplished by operation of the motor 198 (FIG. 4). Thus, when motor 198 rotates drive shaft 196 and extends lead screw 192 from the housing of screw jack 194, the left end fulcrums of connecting links 178, 180, 182 and 184 move down, as viewed in FIG. 3, causing the mid-point of the needling range of needle board 86g (and needles 88g) to move up. This brings the needles out of contact with the strip of felting batt 101 that is passing therebeneath on table 90. Similarly, when the direction of rotation of motor 198 is reversed and the lead screw 192 is retracted into the housing of screw jack 194, the left ends or fulcrums of connecting links 178, 180, 182 and 184 are raised, causing the center of the needling range of needle board 86g (and needles 88g) to move downwardly, thereby bringing the needles 88g into engagement with the strip of felting batt 101 that is passing therebeneath on table 90 and causing the strip of felting batt to be needled to the remaining material on the table. The direction and amount of rotation of the motors 198 are controlled by the hereinbefore mentioned electronic control unit 130.

Figure 5:
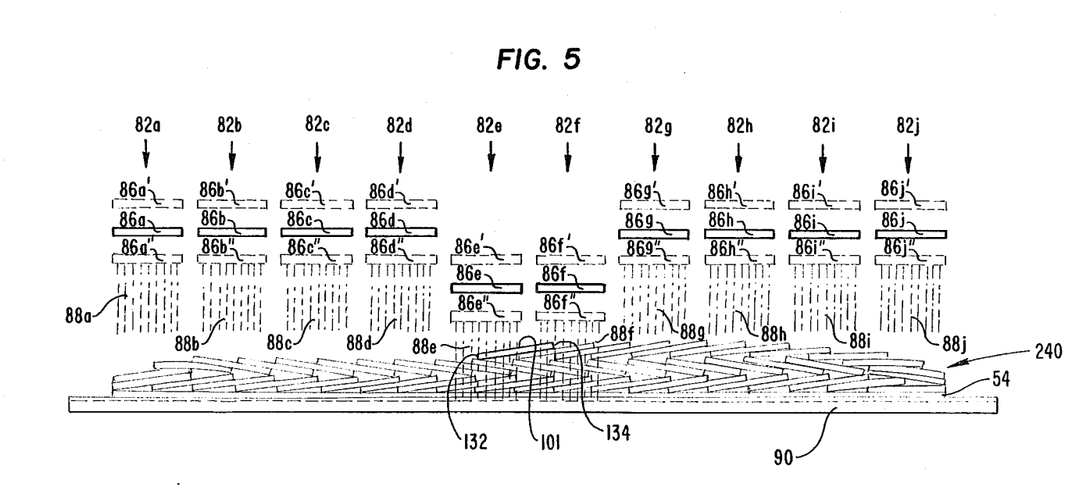
FIG. 5 is a diagrammatic end elevation view, with parts omitted for clarity, showing selected needling units of the second needling mechanism actuated to needle the strip of felting batt passing thereunder.

Referring to FIGS. 2 and 5, the needle boards 86a-86j and the needles 88a-88j of the needling units 82a-82j have been diagrammatically represented relative to delivery table 90 below the needling units, base fabric 54, a plurality of turns of spirally wound strips of felt batt, indicated generally at 240, and the strip of felting batt 101 being let off the roll of felting batt 102. As illustrated in FIG. 5, the strip of felting batt 101 is primarily under the needling unit 82f and partially under the needling unit 82e. Thus, these two units are shown actuated so that their needling ranges have been lowered and the needles 88f and 88e are oscillating into and out of penetration with the strip 101 and the mass 240 of felting batt, needling the strip to the mass. The remaining needles 82a-82d and 82g-82j are oscillating in their upper needling ranges wherein the needles remain out of contact with the mass 240.

As the lead screw 116 moves the roll 102 toward the needling unit 82a, the trailing edge 134 of strip 101 will move to the left of needling unit 82f (as viewed in FIG. 5) and the electronic control unit 130 will generate an "off" signal which causes the motor 198 to drive the lead screw 192 of needling unit 82f in a direction that extends the lead screw 192 from the housing of screw jack 194. This, in turn, raises the needling range of the needle board 86f and needles 88f out of engagement with the mass 240 of felting batt on the table 90. Similarly, when the leading edge 132 of strip 101 enters under the needling board 86d of needling unit 82d, the electronic control unit 130 will generate an "on" signal which causes the motor 198 of needling unit 82d to drive the lead screw 192 of that unit in a direction that retracts the lead screw into the housing of the screw jack 194 thereof, lowering the needling range of the needle board 86d and needles 88d into needling contact with the strip 101 and mass 240 on table 90. This process is repeated with respect to each of the needling units 82a-82j as the strip 101 traverses up and back across the width of table 90.

When the desired thickness of the mass of felting batt 240 has been reached and has been preliminarily tacked together by the selective operation of the various needling units 82a-82j, the strip 101 is severed from the let off roll 102 and the electronic control unit 130 signals all of the needling units 82a-82j to raise their needling boards out of contact with the mass of felting batt 240. Control unit 130 also concurrently signals the drive motor 26 (FIG. 2) of the first needling mechanism 20 to begin full width, two row needling of the mass of felting batt 240 passing therebeneath. When the entire longitudinal length of the mass of felting batt 240 on the base fabric 54 has passed beneath the two rows of needling units 22a-22j and 24a-24j, the full width needling operation of first needling mechanism 20 is terminated.

Thereafter the tension on the longitudinally oriented felt is released by moving the loom tension unit 50 to the right, as viewed in FIG. 1, and the completed, longitudinally oriented felt is removed from the apparatus 10. At this point the apparatus 10 can be loaded with a new base fabric 54 and the cycle started again to make a new longitudinally oriented felt.

It will be apparent from the foregoing description that this invention provides an improved apparatus for manufacturing endless, needled, longitudinally oriented paper machine felts, in which apparatus a full width needling mechanism having a plurality of smaller, selectively operable needling units therein is employed to preliminarily needle a felting batt strip to adjacent felting batt loops and to a base fabric as the strip is applied thereto. The needling units are selectively actuated to needle the felting batt strip to the adjacent felting batt loops and to the base fabric only while the strip is passing under a corresponding needling unit while it is being wound into loops. An additional full width needling mechanism is employed in the preferred embodiment of the invention to finally needle the entire mass of felting batt on the needling table after the preliminary needling of the longitudinal windings has been completed.

While a particular embodiment of this invention has been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

What is claimed is:

1. An apparatus for manufacturing an endless needled paper machine felt having a predetermined width formed from a plurality of overlapping loops of a strip of material of narrower width than said predetermined width, said apparatus comprising:

(a) a needling mechanism having a working width at least equal to said predetermined width and including a plurality of adjacent, driven needling units, each of which reciprocates a needlecarrying board through a predetermined range that is movable between a strip needling position and a non-needling position;

(b) a feeder operable to feed said strip of material from a web thereof to said needling mechanism;

(c) means for reciprocating said web throughout said working width; and (d) means associated with each of said needling units and correlated to the position of said web relative to said working width for selectively actuating corresponding ones of said needling units to needle said strip when said strip is in alignment with said corresponding ones of said units.

2. In an apparatus for manufacturing an endless needled paper machine felt having a predetermined width, the felt comprising at least one ply formed from a plurality of overlapping loops of a strip of material of narrower width than said predetermined width, said apparatus including a first needling mechanism having a working width at least equal to said predetermined width, a feeder operable to feed said strip of material from a web thereof to said first needling mechanism, and means for reciprocating said web throughout the working width of said first needling mechanism, the improvement comprising;

(a) a second needling mechanism having a working width at least equal to said predetermined width and including a plurality of driven, adjacent needling units each of which is actuable between a needling position and a non-needling position; and (b) means associated with each of said needling units and correlated to the position of said web relative to said working width for selectively actuating corresponding ones of said needling units to needle said strip when said strip is in alignment with said corresponding ones of said units.

3. Apparatus according to claim 2 wherein said strip of material has a leading edge and a trailing edge, and wherein said needling unit actuating means actuates said needling unit to needle said strip when the leading edge of said strip enters said needling unit and deactuates said needling unit to stop needling said strip when the trailing edge of said strip leaves said needling unit.

4. Apparatus according to claim 3, wherein each of said needling units includes a needle board carrying a multiplicity of needles, drive means for reciprocating said needle board within a predetermined range toward and away from said strip and linkage means interconnecting said drive means and said needle board, and wherein said needling unit actuating means coacts with said linkage means to move said predetermined range toward and away from said strip thereby to correspondingly move said needle board between said strip needling and non-needling positions.

5. Apparatus according to claim 4, wherein said second needling mechanism is positioned between said first needling mechanism and said web.

6. Apparatus according to claim 3, wherein said needling unit actuating means includes means cooperative with said web reciprocating means and responsive to the position of said web reciprocating means for actuating and deactuating said needling unit.

7. Apparatus according to claim 4, wherein each of said needling units includes a needle board carrying a multiplicity of needles, drive means for reciprocating said needle board within a predetermined range toward and away from said strip and linkage means interconnecting said drive means and said needle board, and wherein said needling unit actuating means coacts with said linkage means to move said predetermined range toward and away from said strip thereby to correspondingly move said needle board between said strip needling and non-needling positions.

8. Apparatus according to claim 7, wherein said second needling mechanism is positioned between said first needling mechanism and said web.

9. Apparatus according to claim 2, wherein each of said needling units includes a needle board carrying a multiplicity of needles, drive means for reciprocating said needle board within a predetermined range toward and away from said strip and linkage means interconnecting said drive means and said needle board, and wherein said actuating means coacts with said linkage means to move said predetermined range toward and away from said strip thereby to correspondingly move said needle board between said strip needling and non-needling positions.

10. Apparatus according to claim 9, wherein said second needling mechanism is positioned between said first needling mechanism and said web.

11. Apparatus according to any one of claims 4, 5, 7-10, wherein said needling units in said second needling mechanism are commonly driven, wherein said drive means includes eccentric shaft and shaft follower members, wherein each of said needling units further includes a vertical push rod connected at one of its ends to said needle board, wherein said linkage means includes a cross link member interconnecting the other of the ends of said push rod with said eccentric shaft follower member, said cross link member including a cross link pivot point therein about which point said cross link member pivots, and wherein said actuating means includes adjusting means connected to said cross link member and operable to raise and lower said pivot point for moving said predetermined range toward and away from said material strip.

12. Apparatus according to claim 11, wherein said adjusting means is connected to said cross link member at said cross link pivot point and said cross link pivot point is positioned adjacent one end of said cross link member, wherein said push rod is pivotally connected to said cross link member adjacent the other end of said cross link member, and wherein said drive means further includes an arm which has one of its ends fixed to said eccentric shaft follower member and the other of its ends pivotally connected to said cross link member intermediate the ends of said cross link member.

13. Apparatus according to claim 12, wherein said actuating means includes a lead screw member pivotally connected to said cross link member at said cross link pivot point, and further including means connected to said lead screw member for vertically moving said lead screw member thereby to correspondingly move said cross link pivot point and to inversely move said predetermined range relative to said strip of material.

14. Apparatus according to claim 13, wherein said means for vertically moving said lead screw member comprises a motor-driven screw jack.

* * * * *

UNITED STATES PATENT AND TRADEMARK OFFICE
CERTIFICATE OF CORRECTION

PATENT NO. : 4,777,706

DATED : October 18, 1988

INVENTOR(S) : Peter P. Stanislaw

It is certified that error appears in the above-identified patent and that said Letters Patent is hereby corrected as shown below:

Column 5, line 59, "ore" should read --one--.
Column 10, line 1, "4" should read --6--.
Column 10, line 21, "coasts" should read --coacts--.

Signed and Sealed this

Sixteenth Day of May, 1989

*Attest:*

DONALD J. QUIGG

*Attesting Officer*     *Commissioner of Patents and Trademarks*